United States Patent [19]

Trego

[11] Patent Number: 4,985,578
[45] Date of Patent: Jan. 15, 1991

[54] PREPARATION OF MODIFIED POLYSILOXANES

[75] Inventor: Brian R. Trego, Dinas Powys, Wales

[73] Assignee: Dow Corning S.A., Valbonne, France

[21] Appl. No.: 253,640

[22] Filed: Oct. 6, 1988

[30] Foreign Application Priority Data

Oct. 24, 1987 [GB] United Kingdom ................ 8724957

[51] Int. Cl.$^5$ .............................................. C07F 7/08
[52] U.S. Cl. .................................................. 556/457
[58] Field of Search ........................................ 556/457

[56] References Cited

U.S. PATENT DOCUMENTS

| | | | |
|---|---|---|---|
| 3,821,114 | 6/1974 | Brown | 556/457 X |
| 3,984,449 | 10/1976 | Brown | 556/457 X |
| 4,209,454 | 6/1980 | Graf et al. | 556/457 |
| 4,298,753 | 11/1981 | Schinabeck et al. | 556/457 X |
| 4,609,752 | 9/1986 | Giesing et al. | 556/457 |
| 4,658,006 | 4/1987 | Inoue | 556/457 X |

FOREIGN PATENT DOCUMENTS 1541637  1/1975  United Kingdom ................ 556/457

*Primary Examiner*—Paul F. Shaver
*Attorney, Agent, or Firm*—Edward C. Elliott

[57] ABSTRACT

The specification describes a method of preparing a polysiloxane including at least one siloxane unit having a silicon-bonded group —OX in which X is a saturated or unsaturated hydrocarbon group, for example methyl, alkenyl or alkynyl. The method comprises bringing about chemical reaction between a polymer having at least one siloxane unit having a silicon-bonded hydroxyl group and an alcohol of the general formula HOX in presnece of an acidic condensation catalyst of the formula (i) $RSO_3H$ in which R represents an alkyl, aryl or alkaryl group which may be halogenated at a temperature of less than 50° C. under conditions to cause condensation reaction between hydroxyl groups of the siloxane units and the alcohol. Preferred polymers are polyorganosiloxanes comprising predominantly dimethyl siloxane units especially those prepared by polymerization of a precursor siloxane comprising at least two siloxane units which have a silicon-bonded hydroxyl group in presence of an acidic condensation catalyst of the formula (i). Preferably the group R of the acidic condensation catalyst is an alkyl group having a chain of 6 to 18 carbon atoms or a group $R''C_6H_4$ where R' represents an alkyl group having 6 to 18 carbon atoms, for example dodecylbenzenesulphonic acid. Water may be present in the reaction mixture to an extent of not more than 7 moles per mole of acidic condensation catalyst. A basic material, e.g. calcium carbonate or magnesium carbonate may be added to the reaction mixture to neutralize the catalyst. Also disclosed are curable compositions including a polysiloxane made according to the invention.

9 Claims, No Drawings

PREPARATION OF MODIFIED POLYSILOXANES

This invention is concerned with the preparation of modified polysiloxanes.

Silicone polymers are known which include at least one siloxane unit having certain organic substituent groups attached to the silicon atom of the siloxane unit through an oxygen atom. Various proposals have been made for the preparation of such materials, including for example the production of polysiloxane polyoxyalkylene copolymers by reaction between a hydroxyl terminated polydiorganosiloxane and a dihydroxyl terminated oxyalkylene polymer in presence of organosulphonic acids. For example in G.B. Patent Specification No. 1 541 637 there is disclosed a process in which such a copolymer is made by heating the reactants at reflux for 3 hours in presence of dodecylbenzeneosulphonic acids. The proportions of the reactants are controlled in order to minimise the effects of chain scission of the polysiloxane which may occur. Methods have been proposed for the manufacture of alkoxy and alkenyloxy polysiloxanes which, principally, employ hydrolysis of hydroxy polysiloxanes and alkoxy or alkenoxy silanes or hydrosilylation.

It is an object of the present invention to provide an alternative method of preparing a polymer including at least one siloxane unit having a hydrocarbon substituent group X attached to the silicon atom of the siloxane unit through an oxygen atom.

We have found that a polysiloxane including at least one siloxane unit having a silicon-bonded group —OX can be prepared in a comparatively short time at room temperature by a method which comprises bringing about chemical reaction between a polymer having at least one siloxane unit having a silicon-bonded hydroxyl group and an alcohol of the general formula HOX, where X represents an aliphatic saturated or unsaturated hydrocarbon group in presence of certain acidic condensation catalysts.

The present invention provides in one of its aspects a method of preparing a polysiloxane including at least one siloxane unit having a silicon-bonded group —OX which method comprises bringing about chemical reaction between a polymer having at least one siloxane unit having a silicon-bonded hydroxyl group and an alcohol of the general formula HOX, where X represents a hydrocarbon group in presence of an acidic condensation catalyst of the formula (i) $RSO_3H$ in which R represents an alkyl, aryl or alkaryl group which may be halogenated at a temperature of less than 50° C. under conditions to cause condensation reaction between hydroxyl groups of the siloxane units and the alcohol.

In a method according to the invention the polymer including at least one siloxane unit having a silicon-bonded hydroxyl group is most suitably a polyorganosiloxane. Polyorganosiloxanes having silicon-bonded hydroxyl groups are well known materials; lower molecular weight materials for example are commonly used as feed stocks or intermediates in the production of polysiloxane products; higher molecular weight materials are commonly used for example as intermediates in production of crosslinked foamed and unfoamed products. The polyorganosiloxane may be linear or branched. It is preferably an $\alpha, \omega$ dihydroxy polydiorganosiloxane of the general formula $HO(R'_2SiO)_xH$ wherein each $R'$ represents a saturated or unsaturated, substituted or unsubstituted hydrocarbon group for example an alkyl group having up to twelve carbon atoms (e.g. methyl, ethyl, propyl, vinyl or allyl) or an aromatic group (e.g. phenyl) and x is an integer having any convenient value such that the polymer has the consistency of a fluid or a gum e.g. a viscosity in the range 400 to 2,000,000 $mm^2/s$. In preferred materials at least 85%, and preferably all, of the $R'$ groups are methyl. The $\alpha, \omega$ polydiorganosiloxane may be prepared, for example, by the addition of the appropriate diorganodichlorosilane to a water/solvent mixture to yield a mixture of low molecular weight hydroxy end-blocked oligomers and cyclic siloxanes in solvent. The mixture may be purified to separate low molecular weight linear $\alpha, \omega$ dihydroxypolydiorganosiloxane oligomers and cyclic polysiloxanes. Linear $\alpha, \omega$ dihydroxy polydiorganosiloxane polymers of desired molecular weight may be manufactured from the low molecular weight linear $\alpha, \omega$ dihydroxy polydiorganosiloxane oligomers (produced as aforesaid or by a process involving ring opening of the cyclic materials referred to) by way of condensation and equilibration in presence of catalyst. The catalyst used for manufacture by way of bulk polymerisation is generally a basic catalyst which can be removed from the reaction mixture. Acidic catalysts may be used for the polymerisation, for example materials of the formula $RSO_3H$ as referred to herein. These acids may be employed to catalyse polymerisation of the low molecular weight linear $\alpha, \omega$ dihydroxy polydiorganosiloxane oligomers in presence of controlled amounts of water. For example we have found that mixtures of hydroxyl end-blocked polydimethylsiloxanes having a viscosity at 25° C. in the range 30 to 160 $mm^2/s$, i.e. an average value of x of about 75, may be polymerised readily at room temperature to a viscosity of the order of about 50,000 $mm^2/s$ by agitation in an open or closed mixing chamber for example a static mixer, planetary mixer or twin screw extruder in presence of an acidic condensation catalyst as defined above and a controlled amount of water.

In a method according to the invention, the hydrocarbon group X of the alcohol of formula HOX may be an aliphatic, alicyclic or araliphatic group and may be aliphatically unsaturated or not, for example a methyl, alkenyl or alkynyl group. The alcohol has a single hydroxyl group and preferably this is not sterically hindered. Preferred alcohols are allyl alcohol and propargyl alcohol. Alcohols exhibiting steric hindrance e.g. 3-methyl-l-butyn-3-ol may be used but the time required for the condensation reaction is extended and polymerisation through the silicon-bonded hydroxyl groups may occur in preference.

In a method according to the invention the acidic condensation catalyst has the formula $RSO_3H$ in which R represents an alkyl, aryl or alkaryl group which may be halogenated. Preferred acids are those having at least partial compatibility or solubility in the reaction mixture and are chosen from acids having the said formula. Acids of the said formula include those having an alkyl group having 6 to 18 carbon atoms, for example hexylsulphonic acid and dodecylsulphonic acid and those having a halogenated alkyl group having up to 18 carbon atoms, for example trifluoromethylsulphonic acid. Benzenesulphonic acid may be used although its effectiveness may be limited due to compatibility considerations. Suitable acids having alkaryl groups R include the monoalkyl and dialkyl substituted benzenesulphonic acids. Preferred acidic condensation catalysts are of the formula $R''C_6H_4SO_3H$ where $R''$ represents a group R as defined above and is preferably an alkyl group having 6 to 18 carbon atoms. A preferred acidic catalyst is dodecylbenzenesulphonic acid, hereinafter referred to as DBSA.

In a method according to the invention the polymer and alcohol may be condensed readily in a mixer in presence of the acidic condensation catalyst. The preferred polymer, alcohol and catalyst may be mixed together in an open or closed mixer at room temperature. When using a polymer prepared by acid catalysis as aforesaid, the alcohol may be added to the polymer when the polymer has a desired molecular size whilst the polymer is in its reaction vessel, or the two may be mixed together in another mixing vessel. Addition of a stoichiometric amount of a primary alcohol to the polymerising mass is generally sufficient to halt the polymerisation due to conversion of the silicon-bonded hydroxyl groups to groups —OX. The condensation reaction between the chosen polymer and the alcohol proceeds comparatively quickly without external application of heat and it is possible to use a static, planetary or extruder type mixer in which the reactants are brought together, mixed and reacted. We prefer to employ an amount of the alcohol in excess of the stoichiometric quantity required for reaction with all OH groups of the polymer present, in order to favour the silanol-alcohol condensation reaction in preference to the silanol-silanol condensation polymerisation reaction. Also, we prefer not to apply heat to the reaction mixture; the reaction at temperatures greater than about 50° C. is accompanied by cleavage of the polysiloxane chains with consequent production of shorter chained hydroxy-polysiloxane molecules. The amount of chain cleavage which occurs appears to be greater when greater amounts of the acidic catalyst are used, but may be reduced by introduction of a controlled amount of water to the system. At temperatures of about 22° C. and in substantial absence of water, the condensation proceeds smoothly in a short time when as little as about 0.1 part by weight of the preferred catalyst is used per 100 parts by weight of the polymer. It is desirable to ensure that the proportion of water to acidic condensation catalyst which is present in the reaction mixture is controlled within certain limits. Water may be present for example as a result of introduction of water to the reaction mixture as an impurity with the reactants, or as a by-product generated in the mixing chamber during the condensation. It is necessary to provide greater amounts of the acidic condensation catalyst when greater amounts of water are present. Preferably, not more than 7 moles (more preferably less than 5 moles) of water are present in the reaction mixture per mole of acidic catalyst present, i.e. the ratio by weight of preferred catalyst to water present preferably is maintained in the region of greater than about 2.5:1, more preferably greater than 3.0:1.

In a method according to the invention the ability of the catalyst to promote condensation or other reactions may be terminated, after the condensation reaction between the polymer and the alcohol, by the addition to the reaction mixture of a basic material to neutralise said catalyst. The basic material may take any suitable physical form and may be for example an organic amine, a metal oxide or a metal carbonate. The salt of the catalyst produced may be left in the composition or filtered out. When the polymer is prepared for use in production of cured products containing filler it is particularly convenient to employ a finely divided metal carbonate or oxide for this purpose. We prefer to use a finely divided solid, for example magnesium oxide, magnesium carbonate or calcium carbonate.

By use of a method according to the invention one may readily convert polysiloxane diols into polysiloxanes having organic groups, without the need for application of heat to the reaction mixture and using simple apparatus. The method provides a particularly attractive route for production of, for example, alkenyloxy and alkynyloxy polysiloxanes which provide a suitable basis for compositions curable at room or elevated temperatures to provide one or two part curing rubbers which may be used for a variety of purposes, for example, as sealants or potting compounds.

A method according to the invention may also include the further step of compounding the polysiloxane or the reaction mixture to provide a curable composition using appropriate curatives and/or catalysts. Of particular interest as curatives for use with the subject polysiloxanes in which X is an alkenyl or alkynyl group are the polysiloxanes having silicon-bonded hydrogen atoms which are capable of reaction therewith by way of a hydrosilylation reaction in presence of a platinum or rhodium compound (e.g. platinum deposited on charcoal or chloroplatinic acid) at room or elevated temperature. Formulations comprising the subject polysiloxanes in which X is an alkyl, alkenyl or alkynyl group also may be provided which cure when heated in presence of an organic perester or peroxide e.g. di-tertiary butyl peroxide, tertiary butyl perbenzoate, 2,5-bis(tertiary butyl peroxy)2,5-dimethylhexane, 2,4-dichlorobenzoyl peroxide or dicumyl peroxide.

The curable compositions may also include solvents, extenders (for example cyclic or fluid polydiorganosiloxanes), pigments (for example carbon black, titanium dioxide), antioxidants and/or fillers. Fillers which may be used include reinforcing fillers such as high surface area silicas whether untreated, pretreated or treated in situ in known manner, and extending fillers e.g. ground quartz, silicates, diatomaceous earth, asbestos, glass fibre and finely divided metal carbonates and oxides.

The present invention provides in another of its aspects a composition comprising a polysiloxane made by a method according to the invention and in which X is an unsaturated group, a polysiloxane having at least one siloxane unit having a silicon-bonded hydrogen atom and a catalyst for the hydrosilylation reaction.

There follows a description of example methods and compositions selected to illustrate the invention. All parts are by weight unless otherwise specified.

EXAMPLE 1

Each of three portions (a), (b) and (c) of 100 parts of water free α, ω dihydroxy polydimethylsiloxane having a viscosity at 25° C. of 60,000 mm$^2$/s were mixed with 2 parts allyl alcohol in a planetary mixer. 2.5 parts of DBSA and 1.0 part of water were added to each portion. These compositions were stirred at room temperature. No change in the viscosity of the portions was detected after 15, 60 and 300 minutes respectively. 40 parts of finely divided calcium carbonate was added to the portions (a), (b) and (c) after 15, 60 and 300 minutes respectively to neutralise the acid. Residual allyl alcohol was distilled from the reaction mixture. The resulting products were all similar in nature and comprised a modified polymer in admixture with calcium carbonate and calcium dodecylbenzenesulphonate.

The following tests indicate the modified polysiloxane comprised at least one siloxane unit having a substituent allyl group derived from the allyl alcohol rather than silicon-bonded hydroxyl groups. The products were mixed with curing agent 1 and the mixtures degassed. Each yielded a well cured non-foamed rubber after storage for 24 hours at room temperature. Examination of swelling of the cured rubbers in xylene showed no difference in the swelling ratios of the three samples (swollen weight divided by dried weight), indicating the alcohol condensation occurred during the first 15 minutes of the reaction time.

Curing agent 1 was a mixture of a copolymer of polydimethyl and polymethyl hydrogen siloxane units and a platinum vinyl siloxane complex known to cure alkenyl substituted polysiloxanes to provide rubbers and to react with polysiloxanes having silicon-bonded hydroxyl groups to provide a foam.

EXAMPLE 2

100 parts of water free $\alpha, \omega$ dihydroxy polydimethylsiloxane having a viscosity at 25° C. of 2,500 mm$^2$/s were mixed with 2 parts allyl alcohol in a planetary mixer. 0.2 part of DBSA was added. The composition was stirred at room temperature. No change in viscosity occurred in 30 minutes. 2 parts of finely divided magnesium carbonate was added to neutralise the acid. Residual allyl alcohol was distilled from the reaction mixture. The resulting product was filtered to remove the carbonate and 100 parts ground silica added. The product was degassed and mixed with curing agent 1. A void and tack free cured rubber resulted after 24 hours aging at room temperature. Cure was completed by heating the product for 2 hours at 150° C. The rubber had a hardness of 51 Shore A. A 2mm sheet of the product was aged for 5 hours in water at 90° C. The hardness and other properties remained unchanged.

EXAMPLE 3

100 parts of hydroxyl end-blocked polydimethylsiloxane having a viscosity at 25° C. of 85 mm$^2$/s and having a total hydroxyl content of 1% were placed in a planetary mixer. 6 parts allyl alcohol, 2.5 parts of DBSA and 0.7 part water were added. The mixture reacted rapidly at room temperature. After 30 minutes, 15 parts calcium carbonate were added, excess alcohol was removed and the product filtered to remove the solids. There was no significant difference between the viscosity of the starting polymer and the converted polymer. The molecular weight of the starting polymer was 9,500 and its hydroxyl value was 1.01%. The molecular weight of the converted polymer was 11,500, its hydroxyl value 0.35% and its allyl content 1.27%.

EXAMPLE 4

100 parts of hydroxyl end-blocked polydimethylsiloxane containing less than 5% (Me$_2$SiO)$_y$ cyclics having a viscosity at 25° C. of 100 mm$^2$/s, having a total hydroxyl content of less than 1% and a water content of about 600 parts per million were placed in a planetary mixer. 2.5 parts of DBSA were added. The mixture reacted rapidly at room temperature producing a polymer comprising an $\alpha, \omega$ dihydroxy polydimethylsiloxane having a viscosity of 50,000 mm$^2$/s within 30 minutes. When the viscosity of the reaction mixture was 50,000 mm$^2$/s, 1 part of allyl alcohol was added to the reaction mixture containing this polymer and mixing continued for 60 minutes. No change in viscosity occurred during this period. 40 parts of finely divided magnesium carbonate were added to the reaction mixture to neutralise the acid catalyst. Residual allyl alcohol was distilled from the reaction mixture. The resulting product comprised a modified polymer in admixture with magnesium carbonate and magnesium dodecylbenzenesulphonate.

The following tests indicate the modified polysiloxane comprised at least one siloxane unit having a substituent group derived from the allyl alcohol rather than silicon-bonded hydroxyl groups. Portions (a) and (b) of the product were mixed with curing agents 1 and 2 respectively. Portion (a), with curing agent 1, yielded a well cured rubber after heating for one hour at 200° C. Portion (b) with curing agent 2, yielded a sticky, incompletely cured gel even after 16 hours aging at room temperature. Curing agent 2 was a mixture of dibutyl tin dilaurate and tetrapropoxysilane which when mixed with an $\alpha, \omega$ dihydroxy polydimethylsiloxane having a viscosity of about 50,000 mm$^2$/s yielded a well cured hard rubber after aging for 2 to 4 hours at room temperature.

EXAMPLE 5

100 parts of water free $\alpha, \omega$ dihydroxy polydimethylsiloxane having a viscosity at 25° C. of 60,000 mm$^2$/s were mixed with 1 part propargyl alcohol in a planetary mixer. 2.5 parts of DBSA and 0.5 part of water were added. The composition was stirred at room temperature. No change in the viscosity of the composition was detected after 60 minutes. 40 parts of finely divided calcium carbonate was added after 60 minutes. Residual alcohol was distilled from the reaction mixture. A portion of the product was cured with curing agent 1 for 1 hour at 100° C. Another portion was cured with 2 parts 2:4 di-chlorobenzoyl peroxide for 2 hours at 150° C. Both portions yielded good rubbers.

EXAMPLE 6

100 parts of water free $\alpha, \omega$ dihydroxy polydimethylsiloxane having a viscosity at 25° C. of 50,000 mm$^2$/s were mixed with 0.1 part methyl alcohol in a planetary mixer. 2.5 parts of DBSA and 0.5 part of water were added. The mixture was stirred at room temperature. After 30 minutes the viscosity of the mixture was 70,000 mm$^2$/s. 130 parts of finely divided calcium carbonate was added to this mixture. Residual alcohol was distilled from the mixture and the product degassed. The product was formulated into a one part sealant by mixing with titanium di-isopropoxy diacetylacetonate and methyltrimethoxysilane. The sealant cured on exposure to moisture and showed a tack free time of 80 minutes, a hardness (Shore A) of 4 and a modulus of 0.17. A sealant made by use of the same polysiloxane which had not been reacted with methyl alcohol had a tack free time of 30 minutes, a hardness (Shore A) of 22 and a modulus of 0.40.

EXAMPLE 7

100 parts of water free $\alpha, \omega$ dihydroxypolysiloxane having a viscosity at 25° C. of 60,000 mm$^2$/s were mixed with 1 part 3-methyl-1-butyn-3-ol. 2.5 parts of DBSA and 0.75 part water were added. The viscosity of the mixture increased to 114,000 mm$^2$/s in 30 minutes. When allyl alcohol was used instead of 3-methyl-1-butyn-3-ol no increase in viscosity occurred.

That which is claimed is:

1. A method of preparing a polysiloxane including at least one siloxane unit having a silicon-bonded group —OX which method comprises bringing about chemical reaction between a polymer having at least one siloxane unit having a silicon-bonded hydroxyl group and an alcohol of the general formula HOX, where X represents a hydrocarbon group in presence of an acidic condensation catalyst of the formula (i) $RSO_3H$ in which R represents an alkyl, aryl or alkaryl group which may be halogenated at a temperature of less than 50° C. under conditions to cause condensation reaction between hydroxyl groups of the siloxane units and the alcohol.

2. A method according to claim 1 wherein the polymer is a polyorganosiloxane comprising predominantly dimethyl siloxane units.

3. A method according to claim 1 wherein the polymer including at least one siloxane unit having a silicon-bonded hydroxyl group is a polysiloxane prepared by polymerisation of a precursor siloxane comprising at least two siloxane units which have a silicon-bonded hydroxyl group in presence of an acidic condensation catalyst of the formula (i) and the alcohol HOX is added to the polymerising siloxane when the polysiloxane has a desired molecular size.

4. A method according to claim 1 wherein X represents an alkenyl or alkynyl group.

5. A method according to claim 1 wherein the alcohol comprises allyl alcohol or propargyl alcohol.

6. A method according to claim 1 wherein the group R of the acidic condensation catalyst is an alkyl group having a chain of 6 to 18 carbon atoms or a group $R''C_6H_4$ where R" represents an alkyl group having 6 to 18 carbon atoms.

7. A method according to any one of claims 1 to 6 wherein the catalyst comprises dodecylbenzenesulphonic acid.

8. A method according to claim 1 wherein water is present in the reaction mixture to an extent of not more than 7 moles per mole of acidic condensation catalyst.

9. A method according to claim 1 wherein a basic material is added to the reaction mixture to neutralise said catalyst.

* * * * *